(12) United States Patent
Hickey et al.

(10) Patent No.: US 12,388,131 B2
(45) Date of Patent: Aug. 12, 2025

(54) VENTILATION SYSTEM FOR A VEHICLE BATTERY

(71) Applicant: GM Global Technology Operations LLC, Detroit, MI (US)

(72) Inventors: Ryan Patrick Hickey, Austin, TX (US); Phillip Daniel Hamelin, Clarkston, MI (US); Alexander M. Bilinski, Avoca, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 514 days.

(21) Appl. No.: 17/888,594

(22) Filed: Aug. 16, 2022

(65) Prior Publication Data

US 2024/0063468 A1 Feb. 22, 2024

(51) Int. Cl.
| | |
|---|---|
| *H01M 10/6556* | (2014.01) |
| *B60L 50/64* | (2019.01) |
| *H01M 10/613* | (2014.01) |
| *H01M 10/625* | (2014.01) |
| *H01M 10/643* | (2014.01) |
| *H01M 10/6566* | (2014.01) |
| *H01M 50/213* | (2021.01) |
| *H01M 50/249* | (2021.01) |
| *H01M 50/291* | (2021.01) |
| *H01M 50/293* | (2021.01) |
| *B60K 1/04* | (2019.01) |

(52) U.S. Cl.
CPC ......... *H01M 10/6556* (2015.04); *B60L 50/64* (2019.02); *H01M 10/613* (2015.04); *H01M 10/625* (2015.04); *H01M 10/643* (2015.04); *H01M 10/6566* (2015.04); *H01M 50/213* (2021.01); *H01M 50/249* (2021.01); *H01M 50/291* (2021.01); *H01M 50/293* (2021.01); *B60K 1/04* (2013.01); *B60K 2001/0438* (2013.01); *H01M 2220/20* (2013.01)

(58) Field of Classification Search
CPC .......... H01M 10/6556; H01M 10/613; H01M 10/625; H01M 10/643; H01M 10/6566; H01M 50/249; H01M 50/293; H01M 50/291; H01M 50/213; H01M 2220/20; B60L 50/64; B60K 1/04; B60K 2001/0438
See application file for complete search history.

(56) References Cited

U.S. PATENT DOCUMENTS

| | | | |
|---|---|---|---|
| 11,569,544 B2* | 1/2023 | Okada | H01M 50/35 |
| 2011/0027632 A1* | 2/2011 | Higashino | H01M 10/6563 429/83 |
| 2018/0015806 A1* | 1/2018 | Yasuda | B60L 58/26 |

* cited by examiner

*Primary Examiner* — Raymond Alejandro
(74) *Attorney, Agent, or Firm* — CANTOR COLBURN LLP

(57) ABSTRACT

A rechargeable energy storage system includes a battery having a plurality of cells. The battery pack includes a first end, a second end, a first side, and a second side, an upper surface, and a lower surface. A battery support includes a support surface supporting the plurality of cells. The support surface has a first end portion, a second end portion, a first side portion and a second side portion. A ventilation member is arranged below the battery support between the first side portion and the second side. The ventilation member includes a surface section, and a plurality of wall members that project outwardly of the surface section. The plurality of wall members define a plurality of ventilation channels.

20 Claims, 4 Drawing Sheets

VENTILATION SYSTEM FOR A VEHICLE BATTERY

INTRODUCTION

The subject disclosure relates to the art of electric vehicles and, more particularly, to a ventilation system for a vehicle battery.

Electric vehicles and hybrid vehicles that include electric power systems include a rechargeable energy storage system (RESS) that stores and provides motive power to a motor. The RESS includes a battery that is typically supported on a structural member that provides impact protection. The battery may be mounted on a thermal runaway propagation (TRP) support. The TRP support provides a ventilation pathway to promote battery cooling.

That is, the TRP support includes multiple openings that allow gasses to pass from the battery. The gases passing through the TRP may pass across adjacent cells toward an outlet. Passing the gases across each cell creates heat transfers that could present as a negative impact on battery cooling. Accordingly, it is desirable to provide a system for directing gases from the TRP support in a manner that reduces cross-cell thermal heat transfer.

SUMMARY

A rechargeable energy storage system, in accordance with a non-limiting example, includes a battery pack having a plurality of cells arranged in parallel rows. The battery pack includes a first end, a second end, a first side, and a second side, an upper surface, and a lower surface. A battery support includes a support surface supporting the battery pack. The battery support includes a first end portion, a second end portion, a first side portion and a second side portion. A ventilation member is arranged below the battery support between the first side portion and the second side portion. The ventilation member includes a surface section having a first end section, a second end section, a first side section that extends along the first side portion and a second side section that extends along the second side portion, and a plurality of wall members that project outwardly of the surface section between the first end section and the second end section. The plurality of wall members define a plurality of ventilation channels.

In addition to one or more of the features described herein a support housing having a first side wall, a second side wall that is opposite the first side wall, a first end wall extending between the first side wall and the second side wall and a second end wall spaced from the first end wall extending between the first side wall and the second side wall, at least one of the first end wall and the second end wall including an opening, the battery, the battery support, and the ventilation member being arranged in the support housing.

In addition to one or more of the features described herein the first end portion of the battery support is spaced from the first side wall, the second end portion of the battery support is spaced from the second side wall, and the second side portion of the battery support is spaced from the second end wall, wherein a first ventilation passage extends between the first end portion and the first side wall, a second ventilation passage extends between the second end portion and the second side wall, and a third ventilation passage extends between the second side portion and the second end wall.

In addition to one or more of the features described herein the opening is formed in the second end wall, the opening being exposed to the third ventilation passage.

In addition to one or more of the features described herein the first ventilation passage is fluidically connected to the second ventilation passage and the third ventilation passage.

In addition to one or more of the features described herein each of the plurality of wall members includes a plurality of interruptions.

In addition to one or more of the features described herein the plurality of interruptions in one of the plurality of wall members align with the plurality of interruptions in each of the other plurality of wall members.

In addition to one or more of the features described herein each of the first side portion and the second side portion of the battery support includes a plurality of openings.

In addition to one or more of the features described herein each of the battery support and the ventilation member are formed from a metal, the ventilation member being in thermal contact with the battery support.

In addition to one or more of the features described herein each of plurality of ventilation channels extends substantially parallel to a corresponding one of the plurality of cells.

An electric vehicle, in accordance with a non-limiting embodiment, includes a body, a plurality of wheels supporting the body, an electric motor, and a rechargeable energy storage system (RESS) operatively connected to the electric motor. The RESS includes a battery pack having a plurality of cells arranged in parallel rows. The battery pack includes a first end, a second end, a first side, and a second side, an upper surface, and a lower surface. A battery support includes a support surface supporting the battery pack. The battery support includes a first end portion, a second end portion, a first side portion and a second side portion. A ventilation member is arranged below the battery support between the first side portion and the second side portion. The ventilation member includes a surface section having a first end section, a second end section, a first side section that extends along the first side portion, and a second side section that extends along the second side portion, and a plurality of wall members that project outwardly of the surface section between the first end portion and the second end portion. The plurality of wall members defines a plurality of ventilation channels.

In addition to one or more of the features described herein a support housing has a first side wall, a second side wall that is opposite the first side wall, a first end wall extending between the first side wall and the second side wall and a second end wall spaced from the first end wall extending between the first side wall and the second side wall, at least one of the first end wall and the second end wall including an opening, the battery, the battery support, and the ventilation member being arranged in the support housing.

In addition to one or more of the features described herein the first end portion of the battery support is spaced from the first side wall, the second end portion of the battery support is spaced from the second side wall, and the second side portion of the battery support is spaced from the second end wall, wherein a first ventilation passage extends between the first end portion and the first side wall, a second ventilation passage extends between the second end portion and the second side wall, and a third ventilation passage extends between the second side portion and the second end wall.

In addition to one or more of the features described herein the opening is formed in the second end wall, the opening being exposed to the third ventilation passage.

In addition to one or more of the features described herein the first ventilation passage is fluidically connected to the second ventilation passage and the third ventilation passage.

In addition to one or more of the features described herein each of the plurality of wall members includes a plurality of interruptions.

In addition to one or more of the features described herein the plurality of interruptions in one of the plurality of wall members align with the plurality of interruptions in each of the other plurality of wall members.

In addition to one or more of the features described herein each of the first side portion and the second side portion of the battery support includes a plurality of openings.

In addition to one or more of the features described herein each of the battery support and the ventilation member are formed from a metal, the ventilation member being in thermal contact with the battery support.

In addition to one or more of the features described herein each of plurality of ventilation channels extends substantially parallel to a corresponding one of the plurality of cells.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
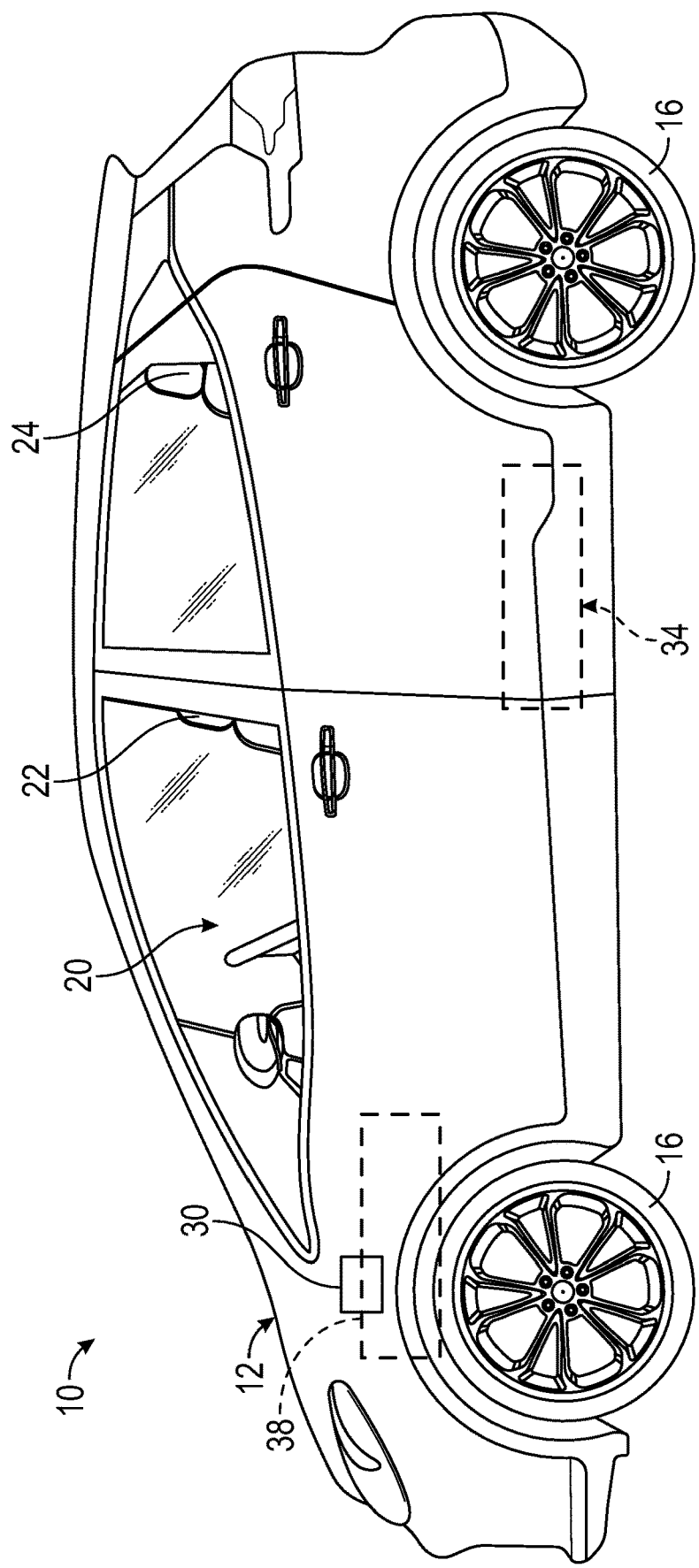
FIG. 1 is a side view of a vehicle including a rechargeable energy storage system (RESS) having a ventilation system, in accordance with a non-limiting example.

The following description is merely exemplary in nature and is not intended to limit the present disclosure, its application or uses. It should be understood that throughout the drawings, corresponding reference numerals indicate like or corresponding parts and features.

An electric vehicle (EV), in accordance with a non-limiting example, is indicated generally at 10 in FIG. 1. Vehicle 10 includes a body 12 supported on a frame (not shown) and a plurality of wheels, two of which are indicated at 16. Body 12 includes a passenger compartment 20 that includes at least one driver's seat 22 and at least one rear passenger seat 24. Vehicle 10 includes a charge port 30 that serves as an interface between an external charging device (not shown) and a rechargeable energy storage system (RESS) 34. RESS 34 is operatively connected to an electric motor 38 that provides motive power to vehicle 10.

Figure 2:
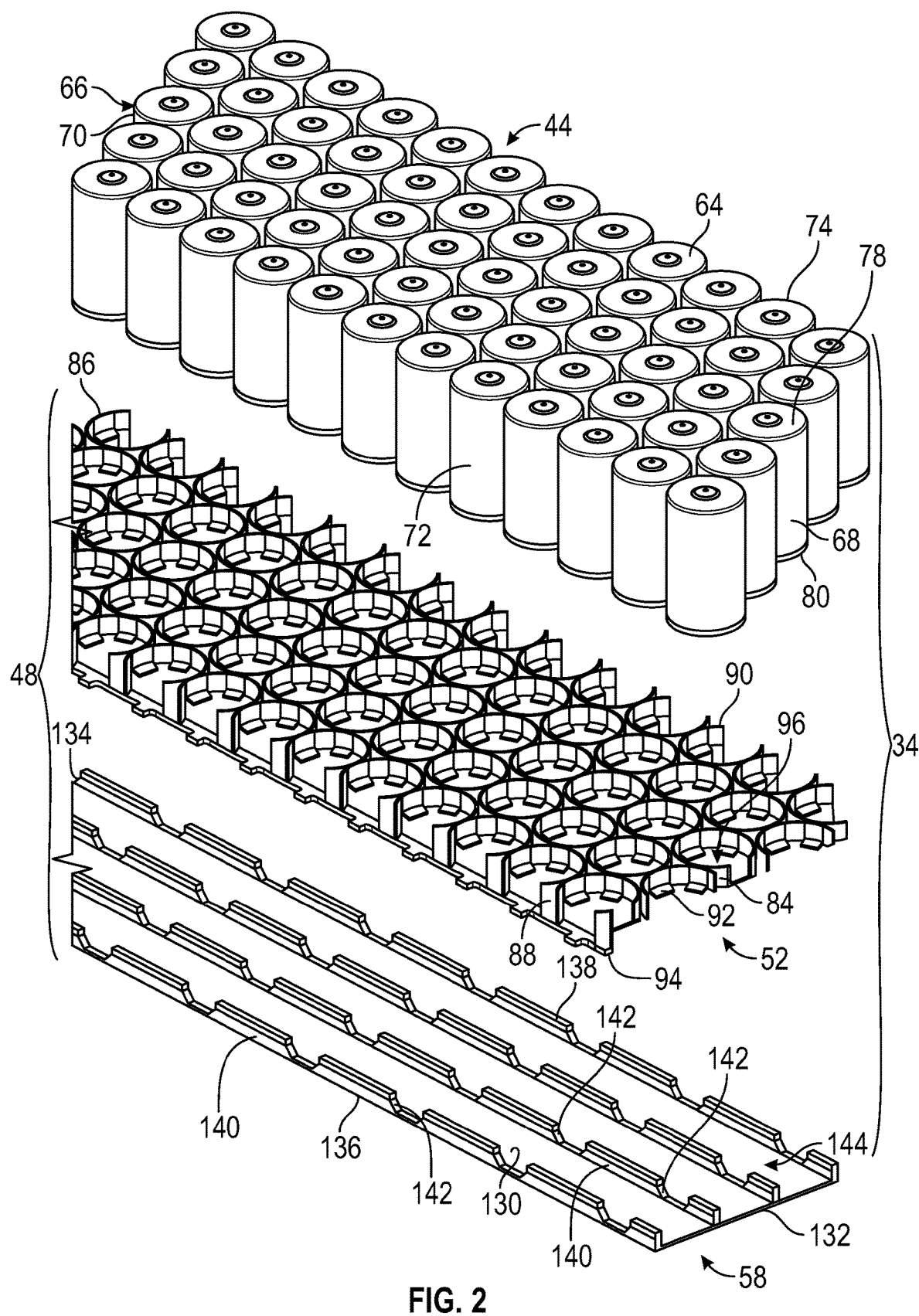
FIG. 2 is a partially disassembled view of a thermal runaway propagation support (TRP) and a ventilation member, in accordance with a non-limiting example.
Figure 3:
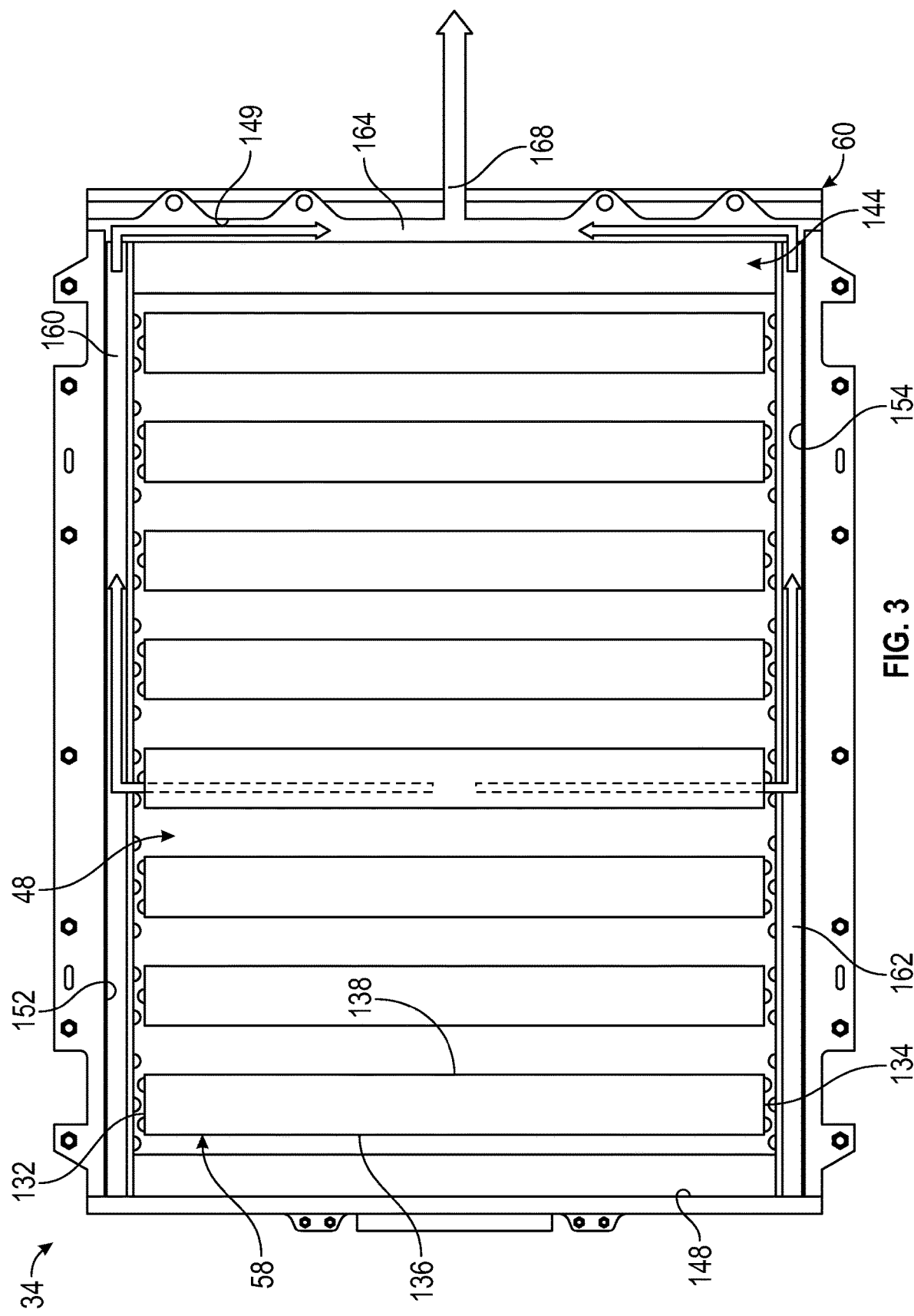
FIG. 3 is a bottom cross-sectional plan view of the RESS, in accordance with a non-limiting example.

In a non-limiting example shown in FIGS. 2 and 3, RESS 34 includes a battery pack 44 that rests upon a ventilation system 48. Ventilation system 48 directs gases from battery pack 44 outward to promote cooling. Ventilation system 48 includes a battery support 52 and a ventilation member 58. Ventilation member 58 is disposed below battery support 52 and, as will be discussed herein, functions to guide gases from RESS 34. In a non-limiting example, battery pack 44, battery support 52, and ventilation member 58 are arranged in a support housing 60 (FIG. 3) which may take the form of a thermal runaway propagation (TRP) system. Support housing 60 provides protection to battery pack 44.

Battery pack 44 includes a plurality of cells 64 that are electrically connected one, to another, to store and provide power to motor 38. The particular type of cell format may vary and could include a cylindrical cells arranged in rows such as shown at 66 or the cell format may take the form of a prismatic cell arrangement. Battery pack 44 includes a first end 68, a second end 70 that is opposite to first end 68, a first side 72, and a second side 74 that is opposite first side 72. Battery pack 44 also includes an upper surface 78 and a lower surface 80. Battery pack 44 is supported on battery support 52 (FIG. 2) in support housing 60.

Battery support 52 is formed from a metal and includes a first end portion 84, a second end portion 86 that is opposite first end portion 84, a first side portion 88, and a second side portion 90 that is opposite first side portion 88. First side portion 88 and second side portion 90 extend between and connect with first end portion 84 and second end portion 86. Battery support 52 includes a support surface 92 that supports battery pack 44 and a lower surface 94. Support surface 92 may include a plurality openings 96 that allow gasses to flow from the plurality of cells 64 toward ventilation member 58.

In a non-limiting example, ventilation member 58 is formed from a metal and includes a surface section 130 including a first end section 132 and a second end section 134 that is opposite to first end section 132. A first side section 136 extends between first end section 132 and second end section 134 and a second side section 138 that opposes first side section 136 and also extends between first end section 132 and second end section 134. A plurality of wall members 140 project outwardly from surface section 130 and form rows (not separately labeled) that extend between first end section 132 and second end section 134. Each of the plurality of wall members 140 include a plurality of interruptions 142. The plurality of wall members 140 is formed in rows (not separately labeled) that extend between first end section 132 and second end section 134 and define a plurality of ventilation channels 144.

Figure 4:
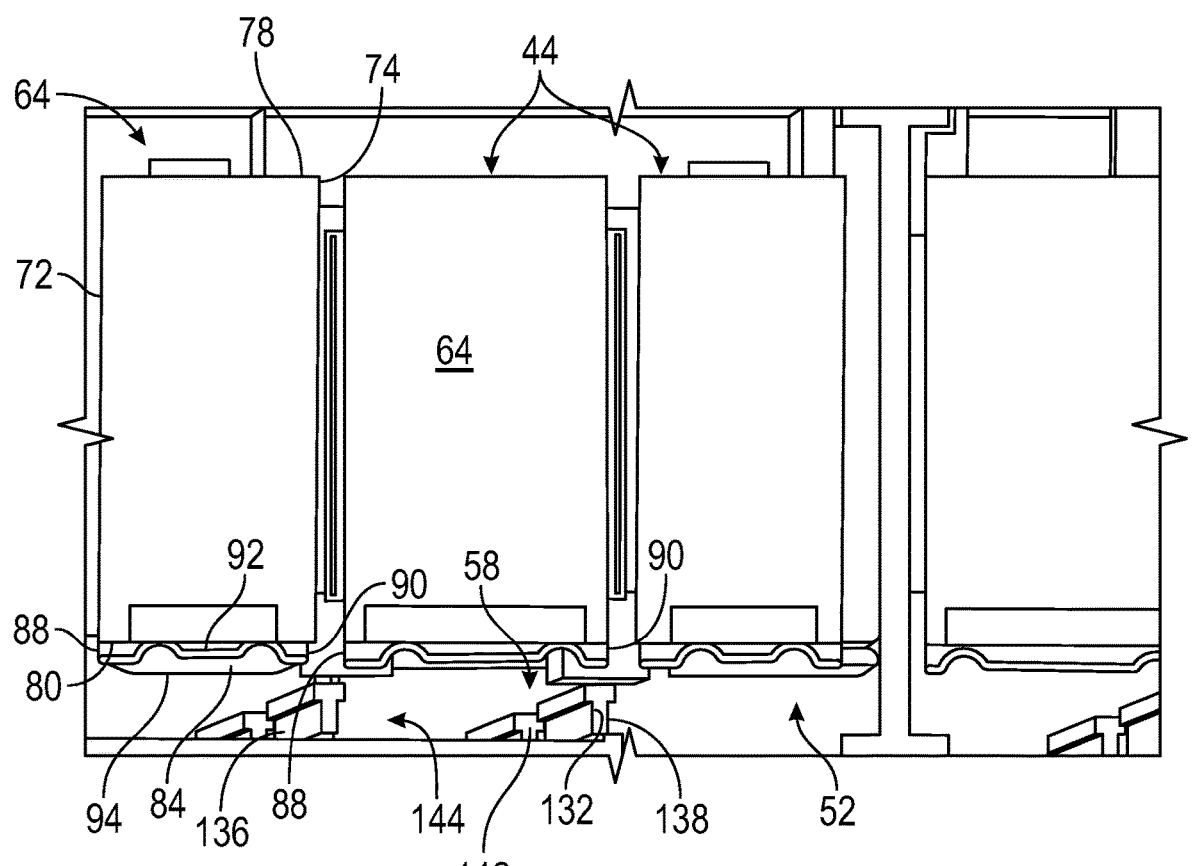
FIG. 4 is a side view of the RESS and the ventilation system, in accordance with a non-limiting example.

In a non-limiting example, support housing 60 includes a base surface (not shown) that is bounded by a first side wall 148, a second side wall 149, a first end wall 152 and a second end wall 154 (FIG. 3). Ventilation member 58 is set on the base surface. Battery support 52 is positioned over ventilation member 58 with first side portion 88 being arranged outwardly of and substantially parallel to first side section 136 and second side portion 90 being arranged outwardly of and substantially parallel to second side section 138. Battery pack 44 is situated on support surface 92 such that the plurality of cells 64 are arranged substantially parallel to the plurality of ventilation channels 144 as shown in FIG. 4.

Ventilation member 58 is positioned on the base surface (not shown) of support housing 50 with first end section 132 being spaced from first end wall 152 forming a first ventilation passage 160 (FIG. 3). Second end section 134 is spaced from second end wall 154 forming a second ventilation passage 162. A third ventilation passage 164 is defined along second side wall 149. In a non-limiting example, first ventilation passage 160 is fluidically connected with second ventilation passage 162 and third ventilation passage 164. Second side wall 149 includes an opening or a gas exit 168.

With this arrangement, gasses developed in a battery pack 44 may pass through battery support 52 and into ventilation member 58 via openings 96. The gases flowing into ventilation member 58 pass outwardly away from battery pack 44 along ventilation channels 144 into first ventilation passage

160 and second ventilation passage 162. The gas passes from first and second ventilation passages 160 and 162 into third ventilation passage 164 and from there out from support housing 60 via opening 168. In this manner, gas build up near battery pack 44 is reduced so as to lower battery pack temperatures. In addition to removing gases, heat is removed via conduction. That is, a heat transfer may pass from battery support 52 into ventilation member 58 and pass into support housing 60.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A rechargeable energy storage system (RESS) comprising:
   a battery pack including a plurality of cells arranged in parallel rows, the battery pack including a first end, a second end, a first side, and a second side extending between the first end and the second end, an upper surface, and a lower surface;
   a battery support including a support surface supports the plurality of cells, the battery support includes a first end portion, a second end portion, a first side portion, and a second side portion; and
   a ventilation member arranged below the battery support between the first side portion and the second side portion, the ventilation member including a surface section having a first end section, a second end section, a first side section that extends along the first side portion, and a second side section that extends along the second side portion, and a plurality of wall members that project outwardly of the surface section between the first end section and the second end section, the plurality of wall members defining a plurality of ventilation channels.

2. The RESS according to claim 1, further comprising a support housing having a first side wall, a second side wall that is opposite the first side wall, a first end wall extending between the first side wall and the second side wall and a second end wall spaced from the first end wall extending between the first side wall and the second side wall, at least one of the first end wall and the second end wall including an opening, the battery, the battery support, and the ventilation member being arranged in the support housing.

3. The RESS according to claim 2, wherein the first end portion of the battery support is spaced from the first side wall, the second end portion of the battery support is spaced from the second side wall, and the second side portion of the battery support is spaced from the second end wall, wherein a first ventilation passage extends between the first end portion and the first side wall, a second ventilation passage extends between the second end portion and the second side wall, and a third ventilation passage extends between the second side portion and the second end wall.

4. The RESS according to claim 3, wherein the opening is formed in the second end wall, the opening being exposed to the third ventilation passage.

5. The RESS according to claim 4, wherein the first ventilation passage is fluidically connected to the second ventilation passage and the third ventilation passage.

6. The RES S according to claim 1, wherein each of the plurality of wall members includes a plurality of interruptions.

7. The RES S according to claim 6, wherein the plurality of interruptions in one of the plurality of wall members align with the plurality of interruptions in each of the other plurality of wall members.

8. The RESS according to claim 7, wherein each of the first side portion and the second side portion of the battery support includes a plurality of openings.

9. The RESS according to claim 1, wherein each of the battery support and the ventilation member are formed from a metal, the ventilation member being in thermal contact with the battery support.

10. The RESS according to claim 1, wherein each of plurality of ventilation channels extends substantially parallel to a corresponding one of the plurality of cells.

11. An electric vehicle comprising:
    a body;
    an electric motor; and
    a rechargeable energy storage system (RESS) operatively connected to the electric motor, the RESS including:
       a battery pack including a plurality of cells arranged in parallel rows, the battery pack including a first end, a second end, a first side, and a second side extending between the first end and the second end, an upper surface, and a lower surface;
       a battery support including a support surface supports the plurality of cells, the battery support includes a first end portion, a second end portion, a first side portion, and a second side portion; and
       a ventilation member arranged below the battery support between the first side portion and the second side portion, the ventilation member including a surface section having a first end section, a second end section, a first side section that extends along the first side portion, and a second side section that extends along the second side portion, and a plurality of wall members that project outwardly of the surface section between the first end section and the second end section, the plurality of wall members defining a plurality of ventilation channels.

12. The electric vehicle according to claim 11, further comprising a support housing having a first side wall, a second side wall that is opposite the first side wall, a first end wall extending between the first side wall and the second side wall and a second end wall spaced from the first end wall extending between the first side wall and the second side wall, at least one of the first end wall and the second end wall including an opening, the battery, the battery support, and the ventilation member being arranged in the support housing.

13. The electric vehicle according to claim 12, wherein the first end portion of the battery support is spaced from the first side wall, the second end portion of the battery support is spaced from the second side wall, and the second side portion of the battery support is spaced from the second end wall, wherein a first ventilation passage extends between the first end portion and the first side wall, a second ventilation passage extends between the second end portion and the second side wall, and a third ventilation passage extends between the second side portion and the second end wall.

14. The electric vehicle according to claim 13, wherein the opening is formed in the second end wall, the opening being exposed to the third ventilation passage.

15. The electric vehicle according to claim 14, wherein the first ventilation passage is fluidically connected to the second ventilation passage and the third ventilation passage.

16. The electric vehicle according to claim 11, wherein each of the plurality of wall members includes a plurality of interruptions.

17. The electric vehicle according to claim 16, wherein the plurality of interruptions in one of the plurality of wall members align with the plurality of interruptions in each of the other plurality of wall members.

18. The electric vehicle according to claim 17, wherein each of the first side portion and the second side portion of the battery support includes a plurality of openings.

19. The electric vehicle according to claim 11, wherein each of the battery support and the ventilation member are formed from a metal, the ventilation member being in thermal contact with the battery support.

20. The electric vehicle according to claim 11, wherein each of plurality of ventilation channels extends substantially parallel to a corresponding one of the plurality of cells.

* * * * *